(No Model.)

G. W. SPENCER.
HARROW ATTACHMENT FOR PLOWS.

No. 322,760. Patented July 21, 1885.

WITNESSES
Phil C. Dietrich
W. R. Keyworth

INVENTOR
George W. Spencer
by J. S. Alexander
Attorney

UNITED STATES PATENT OFFICE.

GEORGE W. SPENCER, OF ST. JAMES, NEBRASKA.

HARROW ATTACHMENT FOR PLOWS.

SPECIFICATION forming part of Letters Patent No. 322,760, dated July 21, 1885.

Application filed June 3, 1885. (No model.)

*To all whom it may concern:*

Be it known that I, GEORGE W. SPENCER, of St. James, in the county of Cedar and State of Nebraska, have invented certain new and useful Improvements in Harrow Attachments for Plows; and I do hereby declare that the following is a full, clear, and exact description thereof, reference being had to the accompanying drawings, and to the letters of reference marked thereon, which form part of this specification, in which—

Figure 1:
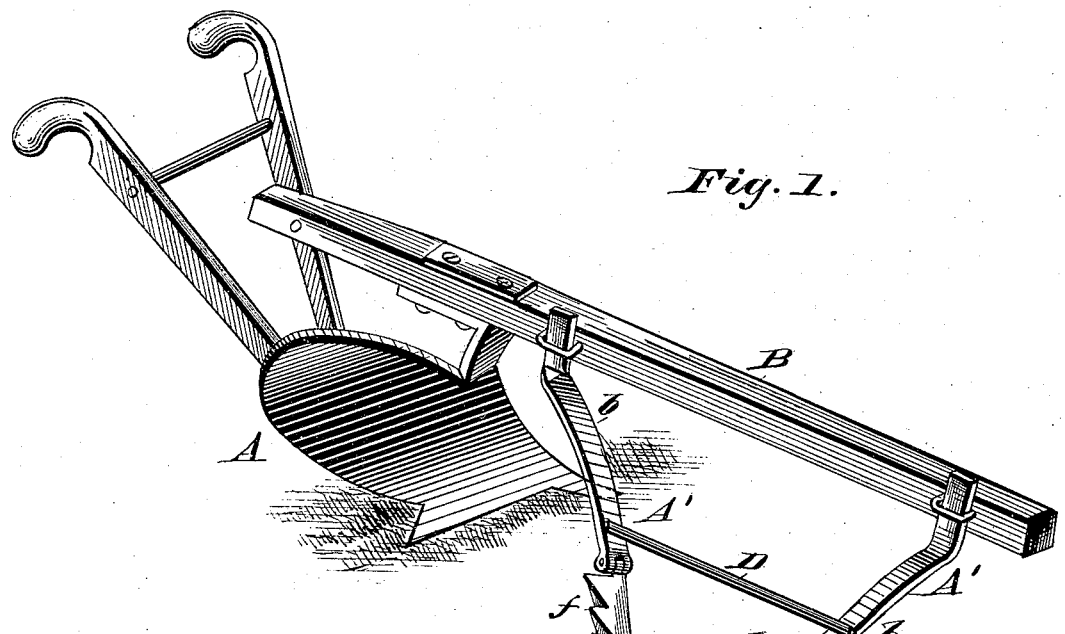
Figure 2:
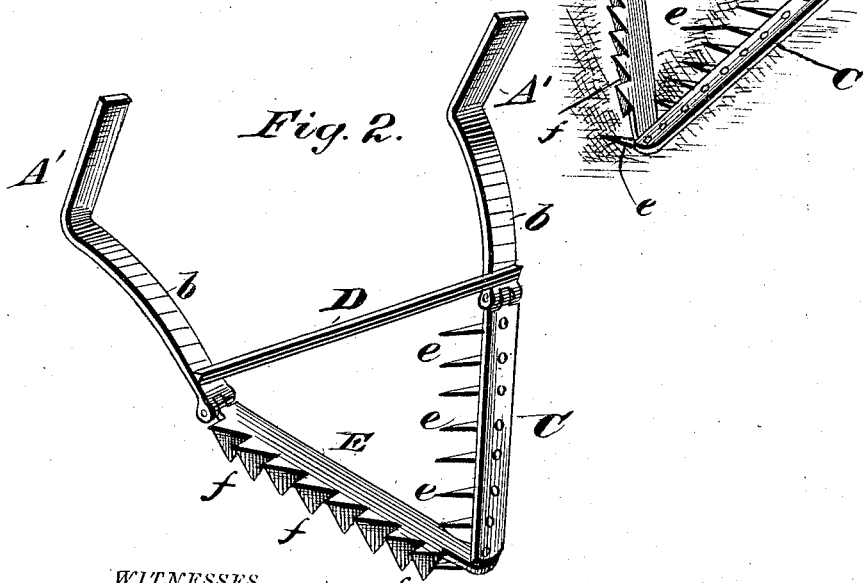

Figure 1 is a perspective view of a plow with my improved pulverizing and leveling device attached thereto. Fig. 2 is a perspective view of the device disconnected from the plow.

The object I have in view is to provide a harrow attachment for a plow, which, operating in connection therewith, will pulverize the newly-plowed ground, and at the same time will also free the same of loose cornstalks and stubble and deposit the same in a position to be turned under the subsequent furrow.

The invention consists in certain novel features of construction, which will be fully understood from the following description, when taken in connection with the annexed drawings.

A represents a plow of any ordinary construction, to the beam B of which, on the furrow side, is secured the supporting-frame A' of my harrow attachment. This frame consists of the downwardly-inclined bars $b\ b$, the inner ends of which are turned nearly at right angles thereto, and are secured to the beam B a suitable distance apart in any desired manner, but preferably by staples, as shown in the drawings. The bars $b\ b$ slightly converge, and are connected or braced near their outer ends by a bar, D. The outer ends of these bars are formed with eyes for the purpose of hinging the harrow.

The harrow attachment is composed of a bar, C, and a plate, E, joined together at their outer ends and secured to the frame A by means of the eyes above referred to, thus making the whole construction in the form of the letter A inverted. The front bar, C, of the harrow attachment has suitably secured to it any desired number of cutters or teeth, $e\ e$, which incline rearward and outward, as shown. The rear plate, E, on the side nearest the plow-share, has a number of slits or incisions, $f$, cut in it extending across about half the width, and which are parallel to each other and at right angles to the sides of said plate. The divisions thus formed are turned down obliquely to form a cutting-surface to pulverize the clods of earth and level the ground.

It is obvious that the harrow attachment or wing when not in use can be turned up out of the way; or it may be provided with a cord or chain connected to its outer end, extending back to and along the beam to the handles, thus affording the attendant means for holding it up in passing from one field to another, or lifting it out of the way when plowing round the stumps of trees; but as this forms no part of my invention, and there are many different means for raising the hinged harrow, I make no claim to or show it in the drawings. The hinges of the frame A' are just far distant enough from the plow-beam to allow the inner end of the plate or bar E to lie above the last-formed furrow when a furrow is being cut. Consequently when the teeth $e$ pass over and pulverize the clods, they will also loosen the stubble or cornstalks and such refuse and direct it against the teeth of the plate E, and as the said teeth stand downward and are wide, and the plate inclines rearward and inward, the refuse will be carried inward to the open furrow adjacent to the plow, and will be covered by the furrow being cut.

Having described my invention, I claim—

1. The combination, with a plow, of a supporting-frame standing laterally therefrom on the side opposite the landside, and a harrow-frame composed of two bars having their inner ends hinged on the supporting-frame and converging thence to their outer ends, which are secured together, the forward harrow-bar being provided with teeth inclining downward and outward to break clods and loosen stubble and refuse, and the rear harrow-bar being provided with wide triangular vertical teeth to level the ground and direct refuse into the open furrow adjacent to the plow, substantially as described.

2. The combination, with a plow, of the frame A', secured to the side of the plow-beam opposite the landside, and provided with the transverse stay-beam D, and the harrow-frame hinged to the outer end of the frame A, and composed of the bar C, provided with the rearward and outward projecting teeth $e$, and the plate E, provided with the wide vertical triangular teeth $f$, substantially as specified.

In testimony that I claim the foregoing as my own I affix my signature in presence of two witnesses.

GEORGE W. SPENCER.

Witnesses:
HENRY J. DIERKS,
ASA A. ELLSWORTH.